United States Patent
Sagong et al.

(10) Patent No.: US 11,023,748 B2
(45) Date of Patent: Jun. 1, 2021

(54) METHOD AND APPARATUS FOR ESTIMATING POSITION

(71) Applicant: Samsung Electronics Co., Ltd., Suwon-si (KR)

(72) Inventors: DongHoon Sagong, Suwon-si (KR); Hyun Sung Chang, Seoul (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 16/295,326

(22) Filed: Mar. 7, 2019

(65) Prior Publication Data

US 2020/0125859 A1  Apr. 23, 2020

(30) Foreign Application Priority Data

Oct. 17, 2018  (KR) .......................... 10-2018-0123488

(51) Int. Cl.
  *G06K 9/00*  (2006.01)
(52) U.S. Cl.
  CPC .............................. *G06K 9/00798* (2013.01)
(58) Field of Classification Search
  CPC ............ G06K 9/00798; G06K 9/00791; G06T 2207/30241; G06T 2207/30236; G06T 2207/30252; G06T 2207/30256; G06T 7/70; G06T 7/536
  See application file for complete search history.

(56) References Cited

U.S. PATENT DOCUMENTS

| 7,440,585 | B2 * | 10/2008 | Roh | G05D 1/0246 |
| | | | | 348/43 |
| 8,487,991 | B2 * | 7/2013 | Zhang | G06K 9/00798 |
| | | | | 348/119 |
| 9,070,202 | B2 * | 6/2015 | Chandraker | G06T 7/73 |
| 9,224,050 | B2 * | 12/2015 | Elinas | G06K 9/00791 |
| 9,298,992 | B2 * | 3/2016 | Harada | G01C 21/30 |
| 9,690,293 | B2 * | 6/2017 | Shashua | B60W 30/10 |
| 9,821,813 | B2 * | 11/2017 | Chandraker | G06T 7/277 |
| 9,863,775 | B2 * | 1/2018 | Kojo | G05D 1/0246 |
| 9,888,235 | B2 * | 2/2018 | Meier | G01S 5/163 |

(Continued)

FOREIGN PATENT DOCUMENTS

| EP | 3 333 803 A1 | 6/2018 |
| JP | 2012-3604 A | 1/2012 |

(Continued)

OTHER PUBLICATIONS

Lepetit, Vincent, "Epnp: An Accurate O (n) Solution to the PnP Problem", *International journal of computer vision*, vol. 81, No. 2, 2009 (12 pages in English).

(Continued)

*Primary Examiner* — Manav Seth
(74) *Attorney, Agent, or Firm* — NSIP Law

(57) ABSTRACT

A method of estimating a position includes: determining a first rotation reference point based on localization information estimated for a target and map data; estimating a second rotation reference point from image data associated with a front view of the target; and correcting the localization information using a rotation parameter calculated based on the first rotation reference point and the second rotation reference point.

24 Claims, 15 Drawing Sheets

(56) References Cited

U.S. PATENT DOCUMENTS

| | | | |
|---|---|---|---|
| 9,990,726 B2* | 6/2018 | Langer | G06T 7/33 |
| 10,215,571 B2* | 2/2019 | Ghadiok | G01C 21/34 |
| 10,249,056 B2* | 4/2019 | Kojo | G06T 7/80 |
| 10,282,861 B2* | 5/2019 | Kwant | G06T 7/74 |
| 10,318,848 B2* | 6/2019 | Dijkman | G06K 9/66 |
| 10,372,968 B2* | 8/2019 | Aghamohammadi | B25J 9/1664 |
| 10,386,850 B2* | 8/2019 | Heinla | G05D 1/0212 |
| 10,732,004 B2* | 8/2020 | Jung | G06T 19/006 |
| 10,762,643 B2* | 9/2020 | Buczko | G06T 7/248 |
| 2009/0022396 A1* | 1/2009 | Watanabe | G06T 5/001 382/167 |
| 2009/0037039 A1* | 2/2009 | Yu | B61L 25/025 701/19 |
| 2010/0033571 A1* | 2/2010 | Fujita | B60W 40/02 348/149 |
| 2010/0097455 A1* | 4/2010 | Zhang | G06K 9/00798 348/119 |
| 2014/0270484 A1* | 9/2014 | Chandraker | G06T 7/277 382/154 |
| 2017/0091565 A1 | 3/2017 | Yokoi et al. | |
| 2018/0075643 A1 | 3/2018 | Sequeira et al. | |
| 2018/0165831 A1* | 6/2018 | Kwant | G05D 1/0251 |
| 2019/0347820 A1* | 11/2019 | Golinsky | G05D 1/0274 |
| 2020/0055515 A1* | 2/2020 | Herman | G06K 9/00805 |
| 2020/0082621 A1* | 3/2020 | Son | G06K 9/00798 |
| 2020/0110183 A1* | 4/2020 | Won | G01C 21/28 |
| 2020/0116499 A1* | 4/2020 | Jung | G08G 1/167 |

FOREIGN PATENT DOCUMENTS

| | | |
|---|---|---|
| JP | 2012-113358 A | 6/2012 |
| JP | 2013-238497 A | 11/2013 |
| JP | 2014-10636 A | 1/2014 |
| JP | 2016-60463 A | 4/2016 |
| JP | 2016-162260 A | 9/2016 |
| KR | 10-2011-0039037 A | 4/2011 |

OTHER PUBLICATIONS

Kluger, Florian, et al., "Deep learning for Vanishing Point Detection Using an Inverse Gnomonic Projection", German Conference on Pattern Recognition. Springer, Cham, 2017 (12 pages in English).

Cui, Dixiao et al., "Real-Time Global Localization of Robotic Cars in Lane Level via Lane Marking Detection and Shape Registration", *IEEE Transactions on Intelligent Transportation Systems*, vol. 17, Issue 4, Apr. 2016 (pp. 1039-1050).

Extended European Search Report dated Nov. 21, 2019 in counterpart European Application No. 19167656.8 (7 pages in English).

* cited by examiner

METHOD AND APPARATUS FOR ESTIMATING POSITION

CROSS-REFERENCE TO RELATED APPLICATIONS

This application claims the benefit under 35 USC § 119(a) of Korean Patent Application No. 10-2018-0123488 filed on Oct. 17, 2018 in the Korean Intellectual Property Office, the entire disclosure of which is incorporated herein by reference for all purposes.

BACKGROUND

1. Field

The following description relates to technology for estimating a position.

2. Description of Related Art

When an object equipped with a global positioning system (GPS) navigation system, such as a vehicle or the like, is moving, the navigation system may receive radio waves from a satellite belonging to a plurality of GPSs, and verifies a current position of the moving object and a speed of the moving object. The navigation system may calculate a three-dimensional (3D) current position of the moving object including latitude, longitude, and altitude information using information received from a GPS receiver. However, GPS signals may include a GPS position error of about 10 meters (m) to 100 m. Such position error may be corrected using other information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of estimating a position includes: determining a first rotation reference point based on localization information estimated for a target and map data; estimating a second rotation reference point from image data associated with a front view of the target; and correcting the localization information using a rotation parameter calculated based on the first rotation reference point and the second rotation reference point.

The method may further include: estimating the localization information by estimating initial localization information including an initial position and an initial pose of the target based on sensing data sensed by a sensor.

The determining of the first rotation reference point may include: extracting a candidate area from the map data based on the localization information; and determining the first rotation reference point based on the candidate area.

The extracting of the candidate area may include extracting an area adjacent to the target in the front view as the candidate area.

The extracting of the candidate area may include extracting an area including a lane boundary line associated with a lane in which the target is travelling as the candidate area.

The determining of the first rotation reference point may include: spanning a lane boundary line included in the candidate area; and determining a point located beyond a threshold distance from the target, among points on the spanned lane boundary line, to be the first rotation reference point.

The estimating of the second rotation reference point may include detecting the second rotation reference point from the image data based on a vanishing-point detection model.

The vanishing-point detection model may include a model trained to output a training reference point from a training image.

The detecting of the second rotation reference point may include: extracting a landmark object from the image data; and detecting the second rotation reference point from the landmark object based on the vanishing-point detection model.

The correcting of the localization information may include: calculating a rotation parameter based on the first rotation reference point and the second rotation reference point; and determining final localization information by correcting the localization information based on the calculated rotation parameter.

The calculating of the rotation parameter may include determining a rotation parameter for correcting the first rotation reference point such that a point obtained by projecting the first rotation reference point onto an image plane matches the second rotation reference point.

The calculating of the rotation parameter may include calculating the rotation parameter based on three-dimensional (3D) coordinates of the first rotation reference point, two-dimensional (2D) coordinates of the second rotation reference point, a camera intrinsic parameter, and a roll angle of the target.

The determining of the final localization information may include determining a final pose of the target by correcting an initial pose using the rotation parameter.

The correcting of the localization information may further include: calculating a position parameter of an initial position of the target after the final pose is determined; and determining a final position of the target by correcting the initial position using the position parameter.

The determining of the final position may include: applying an offset on a first axis to the initial position; and applying an offset on a second axis differing from the first axis to the initial position.

The applying of the offset on the first axis may include applying a component corresponding to a horizontal axis of the target from the position parameter to the localization information. The applying of the offset on the second axis may include applying a component corresponding to a longitudinal axis of the target from the position parameter to the localization information.

The calculating of the position parameter may include determining the position parameter based on a map landmark detected from the map data and an image landmark detected from the image data.

The calculating of the position parameter may include determining the position parameter based on a difference between 2D coordinates of a map landmark detected from the map data and 2D coordinates of an image landmark detected from the image data and corresponding to the map landmark.

In another general aspect, a non-transitory computer-readable storage medium stores instructions that, when executed by a processor, cause the processor to perform the method of estimating a position described above.

An apparatus for estimating a position includes: a sensor configured to sense image data; and a processor configured to determine a first rotation reference point based on localization information estimated for a target and map data, estimate a second rotation reference point from image data associated with a front view of the target, and correct the localization information using a rotation parameter calculated based on the first rotation reference point and the second rotation reference point.

The target may be a vehicle and the sensor may be attached to the vehicle.

The localization information may include information obtained from a GPS signal and an acceleration signal.

Other features and aspects will be apparent from the following detailed description, the drawings, and the claims.

Figure 1:
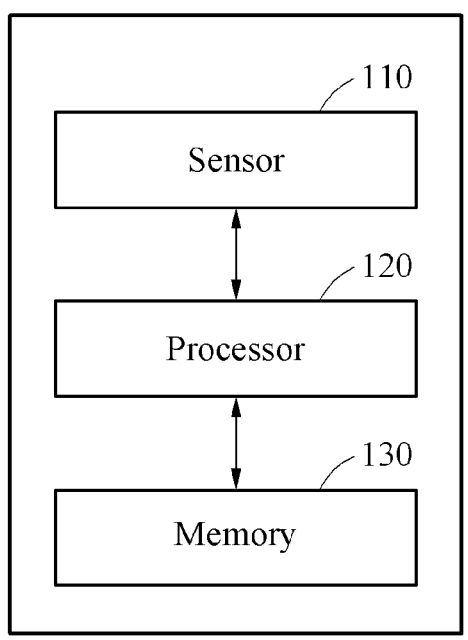
FIG. 1 illustrates an example of a position estimation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a block diagram illustrating an example of a position estimation apparatus 100. In the description herein related to the position estimation apparatus 100, the term "target" refers to an object of which a pose and position are estimated by the position estimation apparatus 100. For example, the position estimation apparatus 100 may be mounted on a vehicle. In this example, the target may be the vehicle.

Referring to FIG. 1, the position estimation apparatus 100 includes, for example, a sensor 110, a processor 120, and a memory 130.

The sensor 110 generates sensing data. For example, the sensor 110 generates sensing data by sensing information used for estimating a position. The information used for estimating a position includes various signals, for example, global positioning system (GPS) signals, an acceleration signal, a velocity signal, and an image signal. The processor 120 primarily measures initial localization information using the sensing data. The initial localization information includes information indicating a position and a pose of the target measured coarsely. For example, the sensor 110 includes inertial measurement unit (IMU) and GPS modules. The sensor 110 acquires an IMU signal and GPS signals indicating an acceleration and an angular velocity of the target as the sensing data.

The IMU is also referred to as "inertial measurer". The IMU measures a change in pose, a change speed for position movement, and a displacement. The IMU includes a three-axis accelerometer that senses a translational motion, for example, an acceleration and a three-axis gyroscope that senses a rotation motion, for example, an angular velocity. Since the IMU does not depend on external information, an acceleration signal and an angular velocity signal may be stably collected. A GPS module receives signals transmitted from at least three artificial satellites to calculate positions of the satellites and the position estimation apparatus 100, and may also be referred to as a global navigation satellite system (GNSS). The GPS module measures an absolute position at 1 hertz and has relatively low noise. Thus, the GPS module may operate stably. An IMU 301 measures a relative position at 100 Hz and performs measurement at high speed.

Also, the sensor 110 senses image data. For example, the sensor 110 includes a camera sensor. The camera sensor receives light in a visible light range and senses an intensity of the light. The camera sensor generates a color image by sensing an intensity of light corresponding to each of a red channel, a blue channel, and a green channel. However, a type of the sensor 110 is not limited to the described example. The sensor 110 may include, for example, an infrared sensor, a Lidar sensor, a RADAR sensor, a thermal image sensor, and/or a depth sensor. The camera sensor captures an external view, for example, a front view from the position estimation apparatus 100 to generate image data.

The processor 120 determines a first rotation reference point based on map data and localization information estimated for the target. The localization information includes information on a position, a pose, and a movement, for example, a speed and an acceleration of the target.

In this disclosure, the term "rotation reference point" refers to a point used as a reference for correcting a rotation error in the localization information estimated for the target. The first rotation reference point is a rotation reference point determined based on the map data. For example, the first rotation reference point may be a three-dimensional (3D) point corresponding to a vanishing point on a two-dimensional (2D) image plane and may indicate a point sufficiently distanced from an image sensor among points on a lane boundary line. Determination of the first rotation reference point will be further described with reference to FIG. 6.

The processor 120 estimates a second rotation reference point from image data associated with a front view of the target. The second rotation reference point is a rotation reference point estimated using image data sensed by the sensor 110. For example, at least two straight lines parallel to each other may be projected onto a 2D image plane. In this example, the second rotation reference point is, as a kind of a vanishing point, a point to which the straight lines converge. Determination of the second rotation point will be further described with reference to FIGS. 7 through 10.

The processor 120 corrects localization information using a rotation parameter calculated based on the first rotation reference point and the second rotation reference point. The rotation parameter is a parameter for compensating for an error between primarily estimated initial localization information and actual position and pose of the target. For example, the camera sensor included in the sensor 110 may be attached to the target, for example, the vehicle, to have an optical axis parallel to a longitudinal axis of the target. In this example, since the camera sensor makes a same motion as a motion of the target, the image data sensed by the camera sensor includes visual information matching the position and pose of the target. Thus, the processor 120 may apply the rotation parameter such that the first rotation reference point corresponding to the initial localization information matches the second rotation reference point detected from the image data. Calculation of the rotation parameter will be further described with reference to FIG. 5. An application of the rotation will be further described with reference to FIGS. 11 through 15.

The memory 130 temporarily or permanently stores data required to perform a position estimation method. For example, the memory 130 stores a vanishing-point detection model for detecting a rotation reference point from image data and a model parameter of the vanishing-point detection model. The vanishing-point detection model will be described with reference to FIGS. 9 and 10.

As described above, the position estimation apparatus 100 estimates initial localization information including an initial position and an initial pose of the target based on sensing data sensed by the sensor 110. The initial localization information may include a pose error and a position error. An error in the initial localization information will be described with reference to FIGS. 2 and 3.

Figure 2:
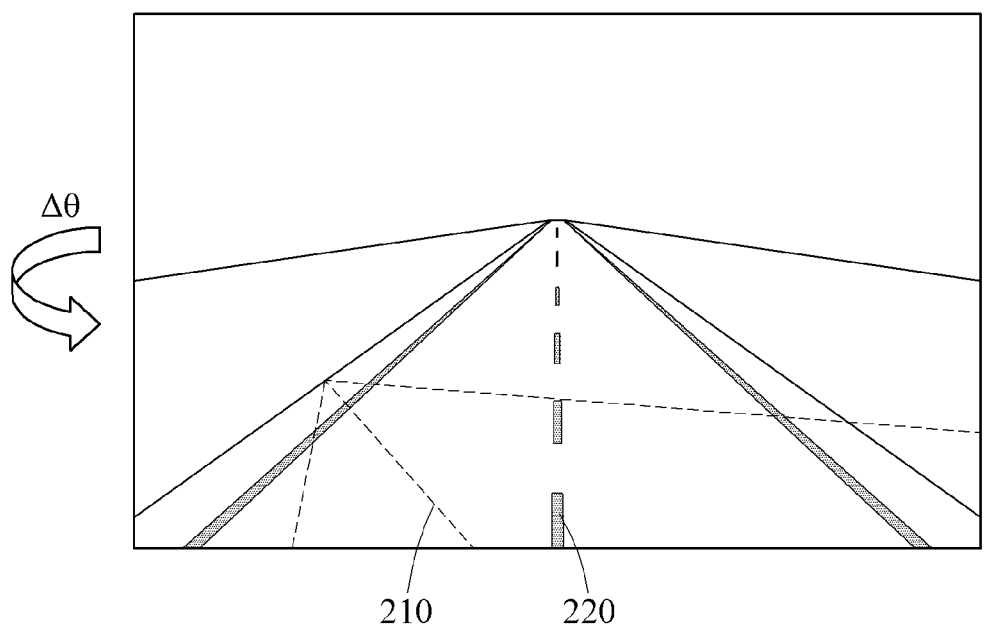
FIGS. 2 and 3 illustrate examples of a position estimation error.
Figure 3:
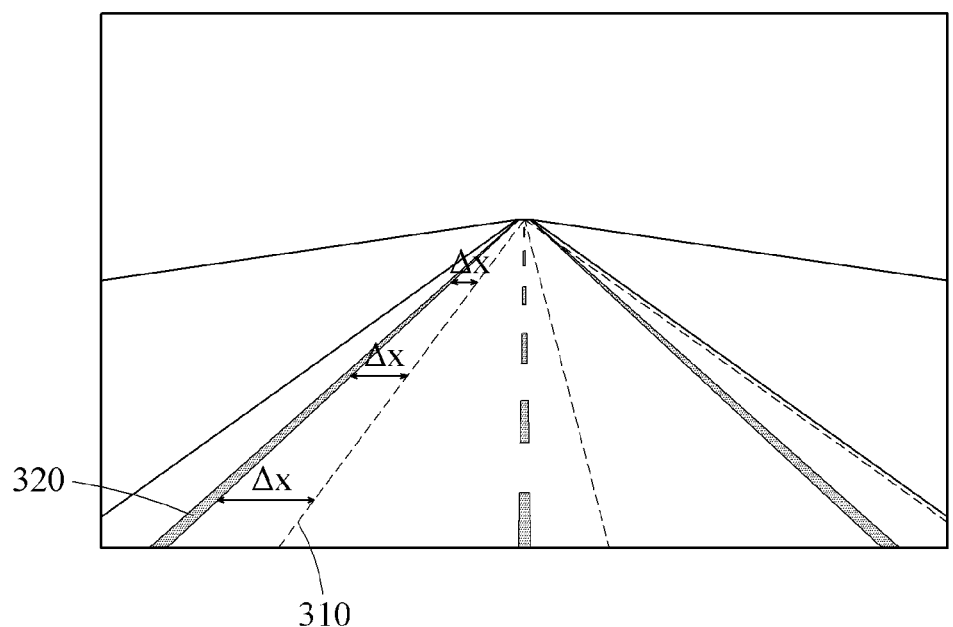

FIGS. 2 and 3 are diagrams illustrating examples of a position estimation error.

A position estimation apparatus measures initial localization information using GPS signals and an acceleration signal. FIG. 2 illustrates a situation in which an initial pose of the initial localization information has a rotation error $\Delta\theta$ with respect to an actual pose. The initial localization information indicates that a target including the position estimation apparatus has a predetermined initial position and a predetermined initial pose. According to map data, for example, a high definition (HD) map, a map lane boundary line 210 corresponding to the initial localization information may be as shown in FIG. 2. An image lane boundary line 220 appearing in image data that is actually captured by an image sensor may be at an angle different from that of the map lane boundary line 210. The position estimation apparatus compensates for such rotation error using a rotation parameter calculated as described with reference to FIG. 5.

The map data includes information associated with a map and includes, for example, information on a landmark. The landmark is an object fixed at a predetermined geographical position to provide a driver with information required to drive a vehicle on a road. For example, road signs and traffic lights may belong to the landmark. For example, according to the Korean Road Traffic act, landmarks are classified into six classes, for example, a caution sign, a regulatory sign, an indication sign, an auxiliary sign, a road sign, and a signal sign. However, classification of the landmarks is not limited to the foregoing. Classes of the landmark may differ for each country.

Also, in this disclosure, the term "lane boundary line" refers to a line defining a lane. The land boundary line is, for example, a solid line or a broken line marked on a road surface, or a curb arranged along an outer edge of a road.

FIG. 3 illustrates a situation in which an initial position of initial localization information has a position error Δx with respect to an actual position. According to map data, a map lane boundary line 310 corresponding to the initial localization information may be as shown in FIG. 3. An image lane boundary line 320 appearing in image data that is actually captured by an image sensor may be at a different position from the map lane boundary line 310. A position estimation apparatus may compensate for such position error as described with reference to FIGS. 12, 14, and 15.

Figure 4:
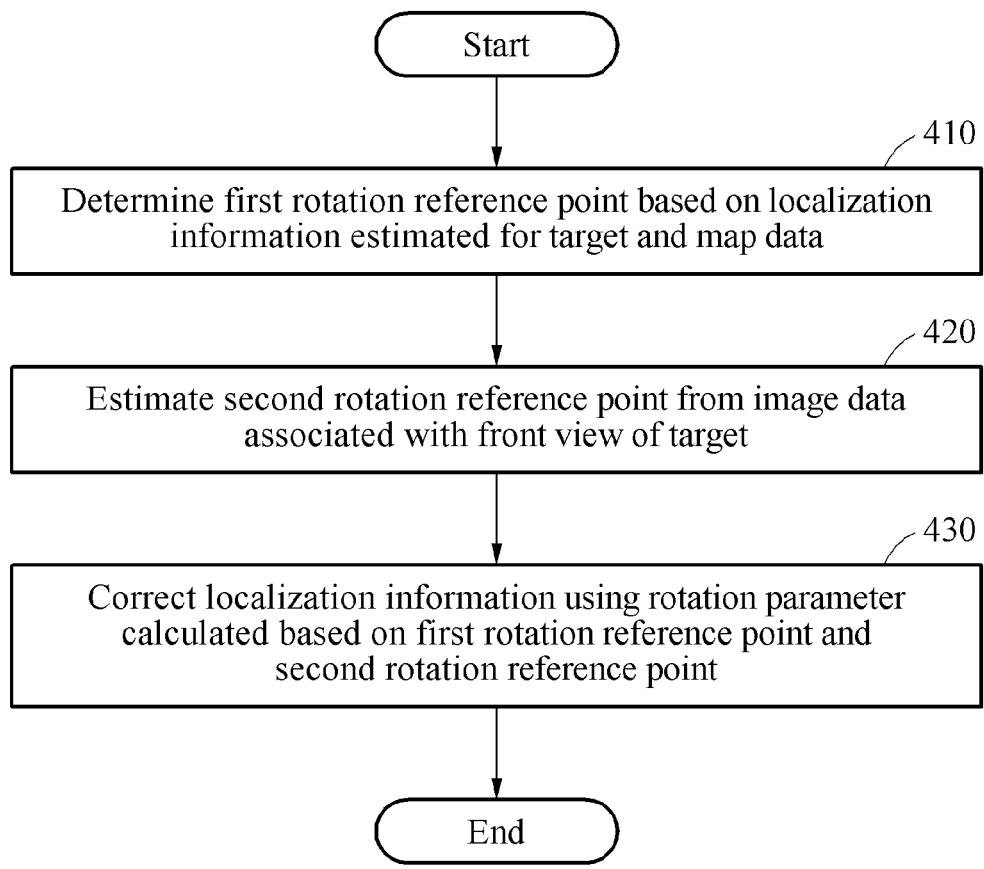
FIG. 4 illustrates an example of a position estimation method.

FIG. 4 is a flowchart illustrating an example of a position estimation method.

In operation 410, a position estimation apparatus determines a first rotation reference point based on localization information estimated for a target and map data. Determination of the first rotation reference point will be further described with reference to FIG. 6.

In operation 420, the position estimation apparatus estimates a second rotation reference point from image data associated with a front view of the target. Estimation of the second rotation reference point will be further described with reference to FIGS. 7 through 10.

In operation 430, the position estimation apparatus corrects the localization information using a rotation parameter calculated based on the first rotation reference point and the second rotation reference point. Correction of the localization information using the rotation parameter will be further described with reference to FIG. 12.

Figure 5:
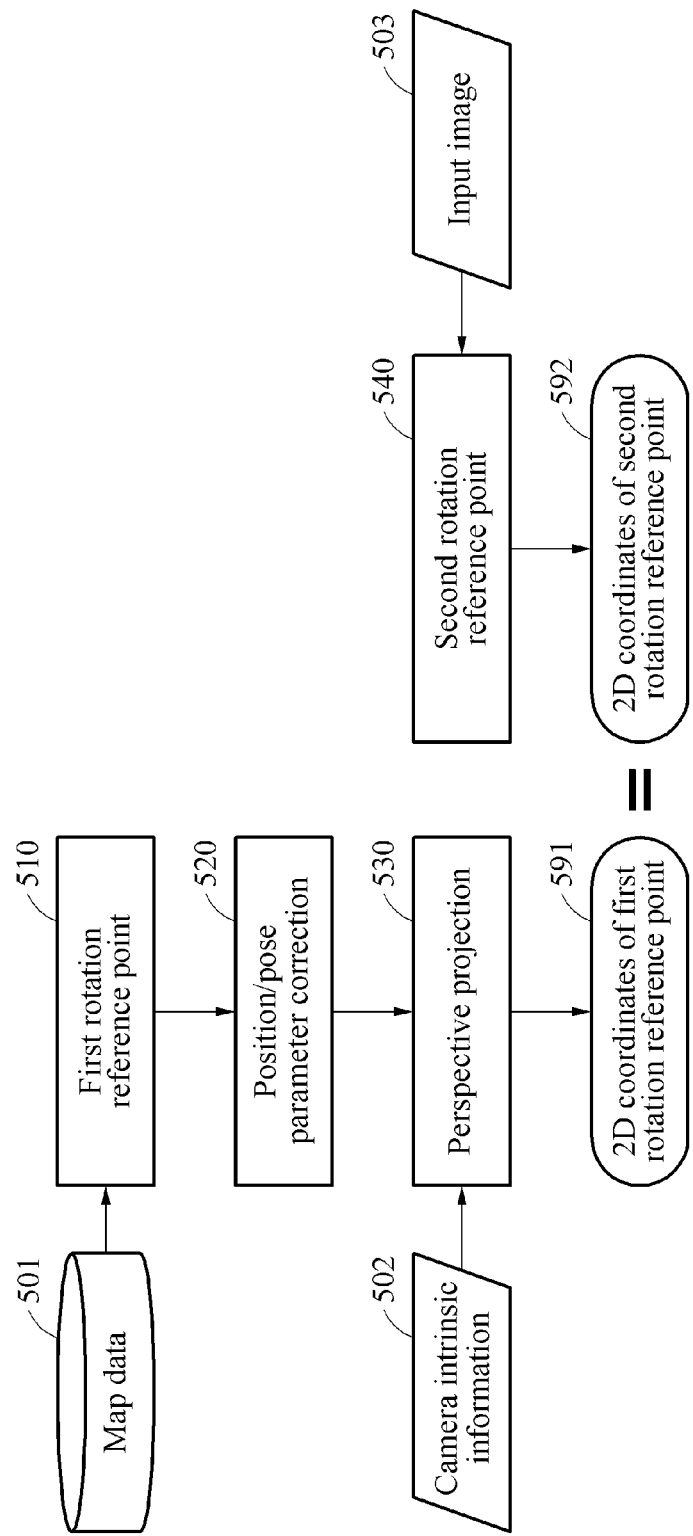
FIG. 5 illustrates an example of calculating a parameter.

FIG. 5 is a diagram illustrating an example of calculating a parameter.

In the example of FIG. 5, it is assumed that a second rotation reference point 540 matches a point to which a first rotation reference point 510 corrected based on a predetermined location error and a predetermined rotation error is projected on an image plane. By arranging an equation under this assumption, a rotation parameter for matching the point to which the first rotation reference point 510 is projected on the image plane and the second rotation reference point 540 is calculated. The position estimation apparatus calculates the rotation parameter based on the first rotation reference point 510 and the second rotation reference point 540. Hereinafter, a process of deriving an equation for calculating the rotation parameter will be described.

The first rotation reference point 510 is determined from map data 501 based on initial localization information. For example, based on the initial localization information, an initial position and an initial pose of a target on the map data 501 is determined. Also, the first rotation reference point 510 corresponds, for example, to a vanishing point of lane boundary lines captured by an image sensor at the initial position and the initial pose of the target. As described above, at least two lane boundary lines may not actually intersect in a 3D space. However, when the land boundary lines are projected onto a 2D image plane, a point at which the projected land boundary lines are predicted to intersect may be determined to be the first rotation reference point 510. Such determination of the first rotation reference point 510 will be further described with reference to FIG. 6.

When the initial localization information, for example, the initial position and the initial pose, has the aforementioned position error and pose error, position/pose parameter correction 520 is performed on the first rotation reference point 510. For example, a position parameter and a pose parameter are compensated for with respect to the first rotation reference point 510. When perspective projection 530 is applied to the first rotation reference point 510 for which the position parameter and the pose parameter are applied, 2D coordinates 591 of the first rotation reference point 510 are acquired. Here, the 2D coordinates 591 of the first rotation reference point 510 may be the same as 2D coordinates 592 of the second rotation reference point 540 detected from an input image 503. Such relationship between the first rotation reference point 510 and the second rotation reference point 540 is represented as shown in the following equations.

$$\begin{bmatrix} v'_x \\ v'_y \\ v'_z \end{bmatrix} = \begin{bmatrix} f & 0 & c_x \\ 0 & f & c_y \\ 0 & 0 & 1 \end{bmatrix} \begin{bmatrix} \cos\theta_z & -\sin\theta_z & 0 \\ \sin\theta_z & \cos\theta_z & 0 \\ 0 & 0 & 1 \end{bmatrix} \begin{bmatrix} 1 & 0 & 0 \\ 0 & \cos\theta_x & -\sin\theta_x \\ 0 & \sin\theta_x & \cos\theta_x \end{bmatrix} \quad \text{[Equation 1]}$$

$$\begin{bmatrix} \cos\theta_y & 0 & \sin\theta_y \\ 0 & 1 & 0 \\ -\sin\theta_y & 0 & \cos\theta_y \end{bmatrix} \begin{bmatrix} p_x - t_x \\ p_y - t_y \\ p_z - t_z \end{bmatrix}$$

In Equation 1, $p_x$, $p_y$, and $p_z$ are 3D coordinates, for example, x, y, and z coordinates of the first rotation reference point 510. $t_x$, $t_y$, and $t_z$ are x, y, and z displacement values of a position parameter (for example, a position error), which correspond to a translation transformation. $\theta_x$, $\theta_y$, and $\theta_z$ are rotation parameters corresponding to a rotation error based on an x axis, a rotation error based on a y axis, and a rotation error based on a z axis.

$$\begin{bmatrix} \cos\theta_y & 0 & \sin\theta_y \\ 0 & 1 & 0 \\ -\sin\theta_y & 0 & \cos\theta_y \end{bmatrix}$$

is a rotation transformation by $\theta_y$ with respect to the y axis.

$$\begin{bmatrix} 1 & 0 & 0 \\ 0 & \cos\theta_x & -\sin\theta_x \\ 0 & \sin\theta_x & \cos\theta_x \end{bmatrix}$$

is a rotation transformation by $\theta_x$ with respect to the x axis.

$$\begin{bmatrix} \cos\theta_z & -\sin\theta_z & 0 \\ \sin\theta_z & \cos\theta_z & 0 \\ 0 & 0 & 1 \end{bmatrix}$$

is a rotation transformation by $\theta_z$ with respect to the z axis.

$$\begin{bmatrix} f & 0 & c_x \\ 0 & f & c_y \\ 0 & 0 & 1 \end{bmatrix}$$

is a matrix for converting the 3D coordinates of the first rotation reference point 510 to which the rotation transformation and the translation transformation are applied into 2D coordinates through the perspective projection 530. f is a focal distance of an image sensor. $c_x$, and $c_y$ are an x coordinate and a y coordinate of a principal point as camera intrinsic information 502, for example, a camera intrinsic parameter. $v'_x$, $v'_y$, and $v'_z$ are 3D coordinates, for example, x, y, and z coordinates of the first rotation reference point 510 projected onto the image plane after error correction.

Although $v'_x$, $v'_y$, and $v'_z$ are the coordinates for convenience of matrix operation, $v'_x$, $v'_y$, and $v'_z$ are points on a homogeneous coordinate system and thus, expressed as 2D coordinates as shown in Equation 2 below.

$$v_x = \frac{v'_x}{v'_z}, v_y = \frac{v'_y}{v'_z} \quad \text{[Equation 2]}$$

When Equation 1 is arranged based on 2D plane coordinates, Equation 3 is obtained as shown below.

$$\begin{bmatrix} v_x \\ v_y \end{bmatrix} = \frac{f}{\sin\theta_x q_y + \cos\theta_x} \begin{bmatrix} \cos\theta_z & -\sin\theta_z \\ \sin\theta_z & \cos\theta_z \end{bmatrix} \begin{bmatrix} q_x \\ \cos\theta_x q_y - \sin\theta_x \end{bmatrix} + \begin{bmatrix} c_x \\ c_y \end{bmatrix}. \quad \text{[Equation 3]}$$

In Equation 3, $q_x$ and $q_y$ are expressed as shown in Equation 4 below.

$$\begin{cases} q_x = \dfrac{\cos\theta_y(p_x - t_x) + \sin\theta_y(p_z - t_z)}{-\sin\theta_y(p_x - t_x) + \cos\theta_y(p_z - t_z)} \\ q_y = \dfrac{p_y - t_y}{-\sin\theta_y(p_x - t_x) + \cos\theta_y(p_z - t_z)} \end{cases} \quad \text{[Equation 4]}$$

In Equation 4, according to characteristics of a vanishing point, $p_z$ is sufficiently large relative to $p_y$ (for example, $p_z \gg p_y$), so $p_y/p_z$ may converge to 0. $p_x/p_z$ is also referred to as $\delta_x$, $\delta_z$ being a constant. Also, according to the characteristics of a vanishing point, $t_x$, $t_y$, and $t_z$ of unknowns $t_x$, $t_y$, $t_z$, $\theta_x$, $\theta_y$, and $\theta_z$ are removed. In this example, $q_x$ and $q_y$ are expressed as shown in Equation 5 below.

$$q_x = \frac{\delta_x + \tan\theta_y}{1 - \tan\theta_y \delta_x}, q_y = 0 \quad \text{[Equation 5]}$$

Accordingly, $q_y$ is removed and $q_x$ is expressed as a value for $\theta_y$ among rotation parameters. In this example, when Equation 3 is rearranged, Equation 6 is obtained as shown below.

$$\begin{bmatrix} v_x \\ v_y \end{bmatrix} = f \begin{bmatrix} \cos\theta_z & -\sin\theta_z \\ \sin\theta_z & \cos\theta_z \end{bmatrix} \begin{bmatrix} q_x/\cos\theta_x \\ -\tan\theta_x \end{bmatrix} + \begin{bmatrix} c_x \\ c_y \end{bmatrix} \quad \text{[Equation 6]}$$

In Equation 6, when a roll angle of a vehicle is given, (for example, $\theta_z=0$), Equation 6 is arranged to be an equation for $\theta_x$ and $\theta_y$. Since variables in Equation 6 other than the unknown $\theta_x$ and $\theta_y$ are given, two simultaneous equations are established for x-axial rotation and y-axial rotation as shown in Equation 7 below.

$$\begin{bmatrix} q_x/\cos\theta_x \\ -\tan\theta_x \end{bmatrix} = \frac{1}{f} \begin{bmatrix} \cos\theta_z & -\sin\theta_z \\ \sin\theta_z & \cos\theta_z \end{bmatrix}^{-1} \begin{bmatrix} v_x - c_x \\ v_y - c_y \end{bmatrix} \quad \text{[Equation 7]}$$

Equations 6 and 7 are derived under an assumption that the 2D coordinates 591 of the first rotation reference point 510 are the same as the 2D coordinates 592 the second rotation reference point 540. Thus, based on Equations 6 and 7, the position estimation apparatus determines a rotation parameter for compensating for the first rotation reference point 510 such that the point to which the first rotation reference point 510 is projected on the image plane matches the second rotation reference point 540. For example, the position estimation apparatus calculates a rotation parameter satisfying Equation 6 or 7 based on the 3D coordinates of the first rotation reference point 510, the 2D coordinates 592 of the second rotation reference point 540, the camera intrinsic parameter, and a roll angle, for example, $\theta_z$ of the target.

An operation of determining 3D coordinates of a first rotation reference point will be described with reference to FIG. 6.

Figure 6:
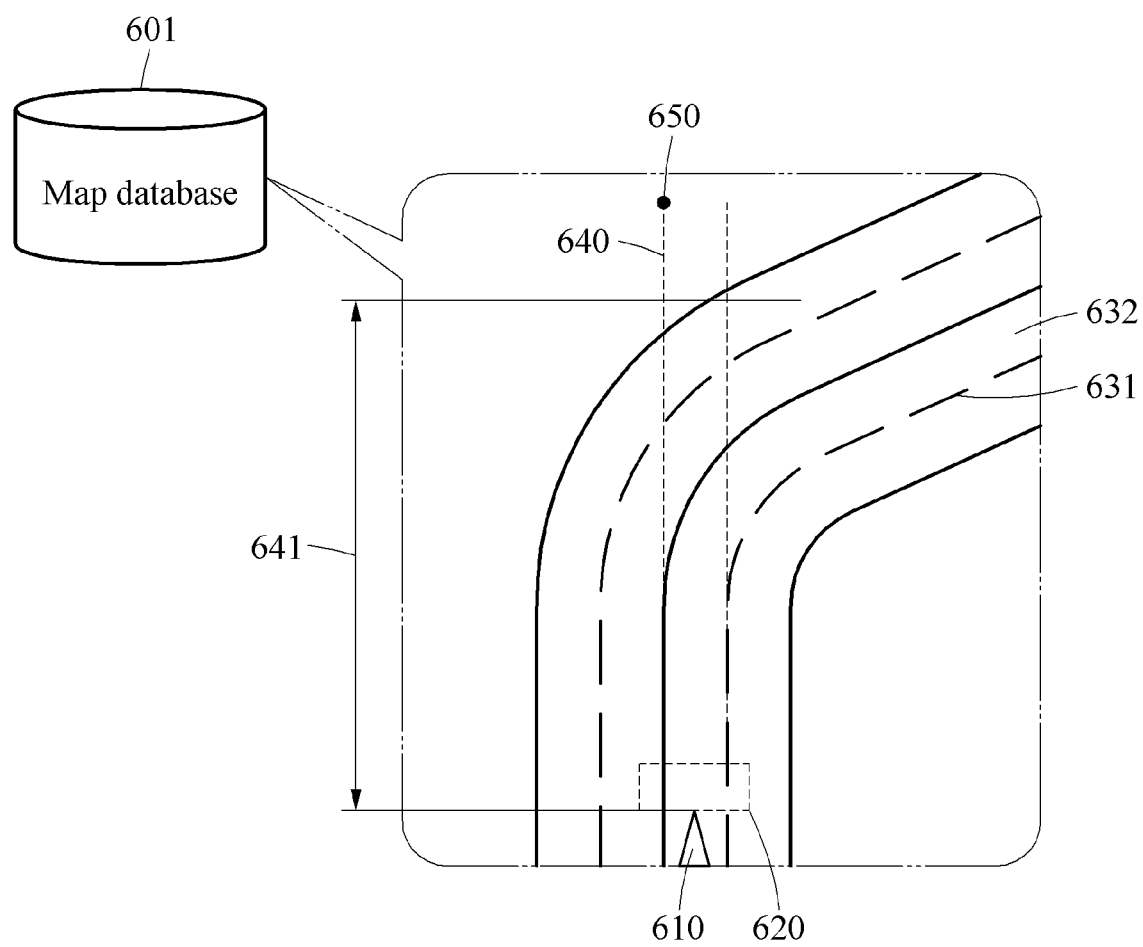
FIG. 6 illustrates an example of a first rotation reference point.

FIG. 6 is a diagram illustrating an example of a first rotation reference point.

A position estimation apparatus determines, to be a first rotation reference point 650, a point sufficiently distanced from a target 610 among points on a lane boundary line. As described above, the first rotation reference point 650 corresponds to a vanishing point at which lane boundary lines 631 intersect on an image plane. This is because a point converts to a vanishing point on an image plane as a distance from the target 610 to the point is sufficiently long.

The position estimation apparatus extracts a candidate area 620 based on location information from map data. The position estimation apparatus loads map data associated with a current position of the target 610 from a map database 601. For example, the position estimation apparatus extracts an area adjacent to the target 610 in front of the target 610 as the candidate area 620. The position estimation apparatus extracts an area including the lane boundary line 631 associated with a lane 632 in which the target 610 is travelling as the candidate area 620. This is because, among the lane boundary lines 631 defining the lane 632 in which the target 610 including the position estimation apparatus is travelling, a lane boundary line close to the target 610 is likely to be stably captured by an image sensor.

The position estimation apparatus determines the first rotation reference point 650 based on the candidate area 620. The position estimation apparatus spans the lane boundary line 631 included in the candidate area 620. For example, the position estimation apparatus selects at least two waypoints from waypoints defining the lane boundary line 631 included in the candidate area 620 and spans a straight line connecting the selected waypoints. However, span of the lane boundary line 631 is not limited to the example. The position estimation apparatus may calculate an average gradient of the waypoints defining the lane boundary line 631 and span a straight line having the calculated gradient. The position estimation apparatus determines, to be the first rotation reference point 650, a point located beyond a threshold distance 641 from the target 610 among points on a spanned lane boundary line 640. 3D coordinates of the determined first rotation reference point 650 are expressed as ($p_x$, $p_y$, $p_z$). Although FIG. 6 illustrates a 2D top view for ease of description, a 3D coordinate system of map data may be converted into a 3D coordinate system having the target 610 (for example, a predetermined point on a perimeter of the target 610 as an origin. Accordingly, the first rotation reference point 650 may be represented by a coordinate system based on the target 610.

A second rotation reference point used as a reference for comparison with the first rotation reference point 650 will be described with reference to FIG. 7 below.

Figure 7:
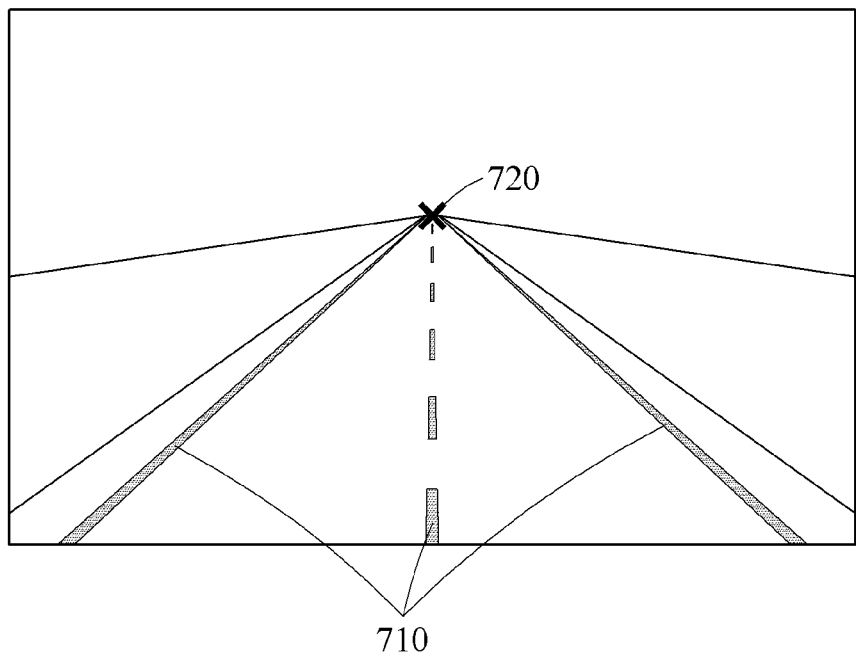
FIG. 7 illustrates an example of a second rotation reference point.

FIG. 7 is a diagram illustrating an example of a second rotation reference point.

A position estimation apparatus detects a second rotation reference point 720 from image data. The position estimation apparatus detects the second rotation reference point 720 from the image data based on a vanishing-point detection model.

For example, the position estimation apparatus detects an intersection point of lane boundary lines 710 as the second rotation reference point 720. The vanishing-point detection model may be obtained by mathematically modeling geometrical and structural information, for example, a gradient, of boundary lines. The position estimation apparatus detects the second rotation reference point 720 from the detected lane boundary lines based on a mathematical model.

However, detection of the second rotation reference point 720 is not limited to the example and a machine learning structure may also be used as the vanishing-point detection model. Detection of the second rotation reference point 720 using a machine learning structure will be further described with reference to FIGS. 8 through 10.

Figure 8:
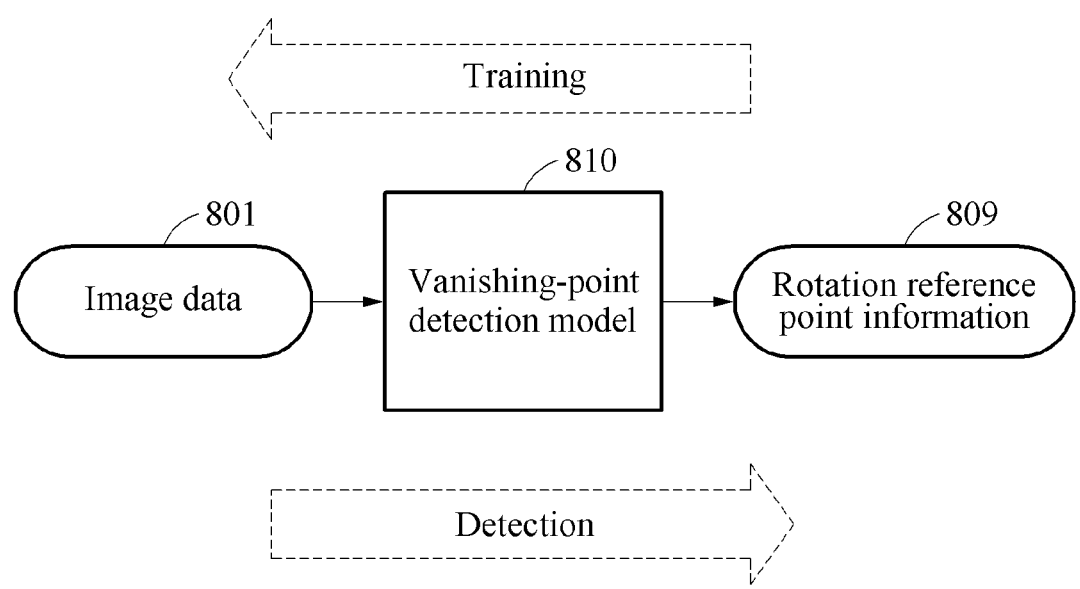
FIGS. 8 through 10 illustrate examples of a vanishing-point detection model for detecting a second rotation reference point.
Figure 9:
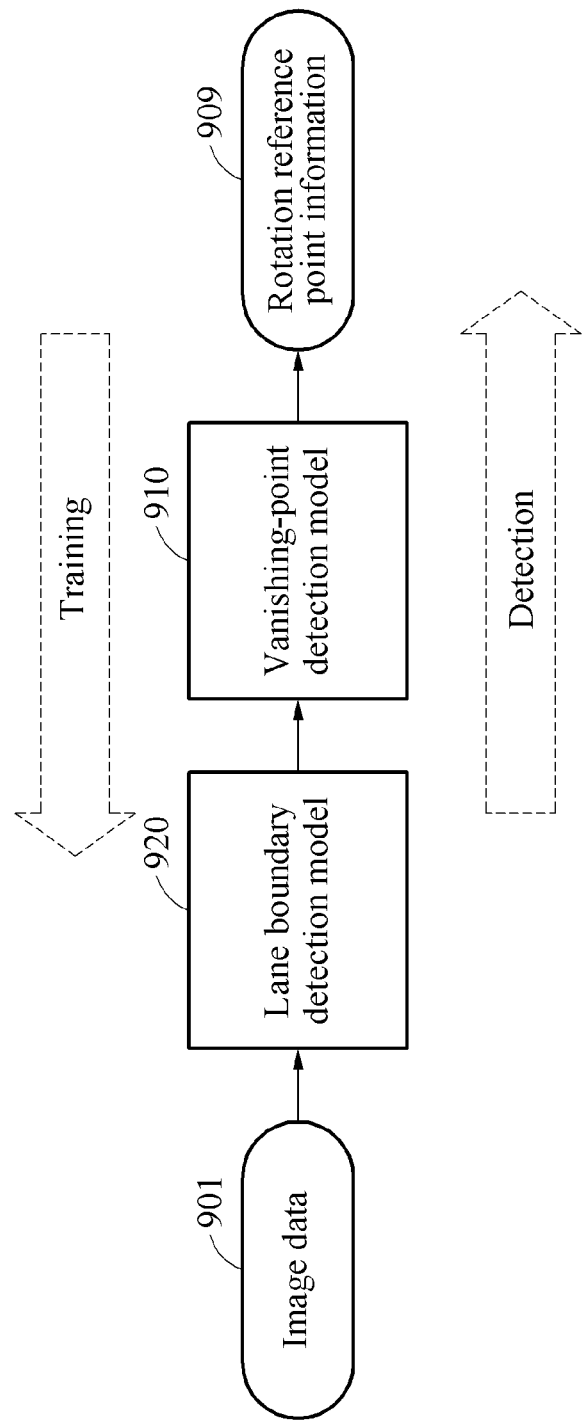
Figure 10:
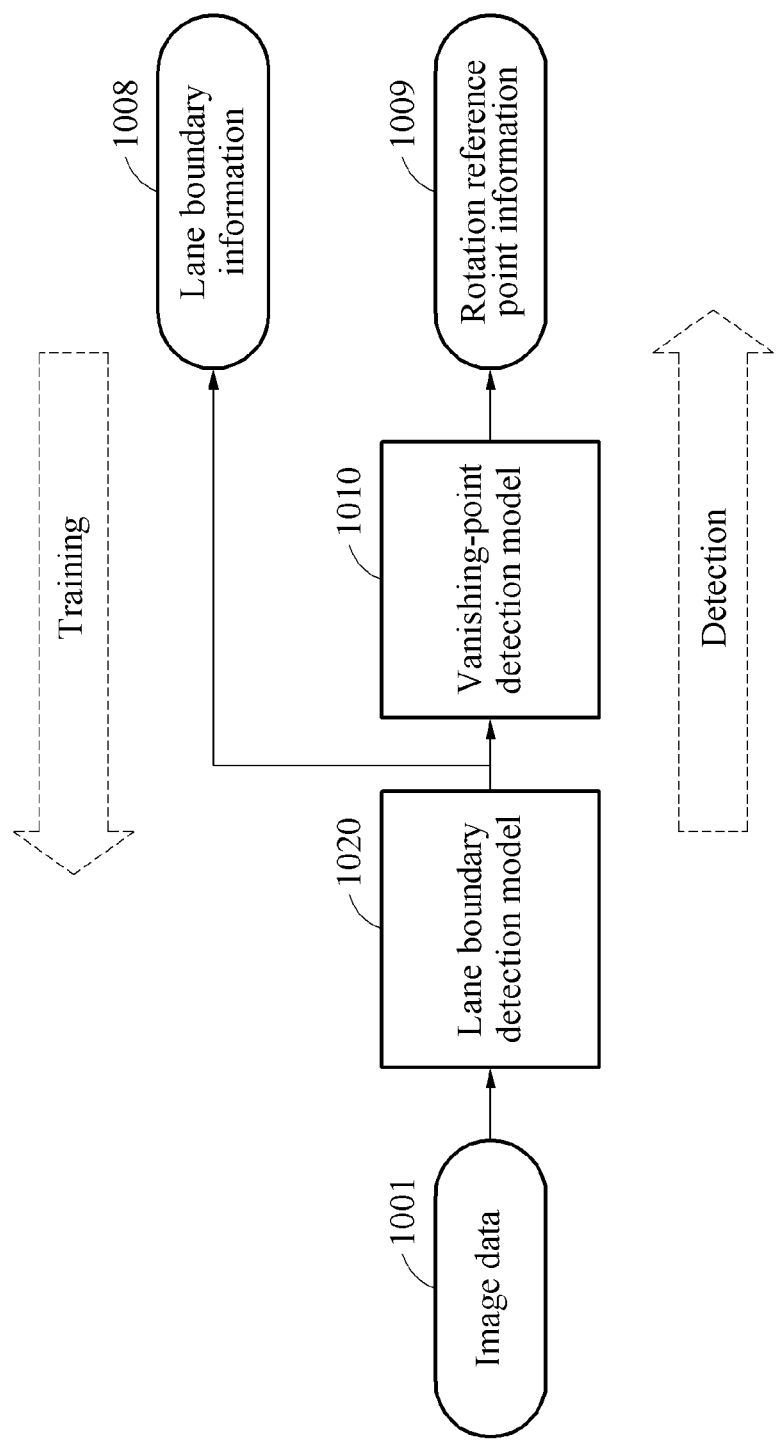

FIGS. 8 through 10 are diagrams illustrating examples of a vanishing-point detection model for detecting a second rotation reference point.

A position estimation apparatus detects a second rotation reference point from image data based on vanishing-point detection models 810, 910, and 1010. A vanishing-point detection model may be implemented using a machine learning structure and include, for example, a neural network.

A neural network is, for example, a deep neural network (DNN). The DNN may include a fully connected network, a deep convolutional neural network (CNN), a recurrent neural network (RNN), a deep belief network, a bi-directional neural network, or a restricted Boltzman machine, or may include different or overlapping neural network portions respectively with full, convolutional, recurrent, and/or bi-directional connections. The neural network performs, for example, object classification, object recognition, voice recognition, and image recognition by mutually mapping input data and output data in a nonlinear relationship based on deep learning. The deep learning is a machine learning scheme for solving issues related to, for example, image or speed recognition from a big data set. The input data and the output data are mapped through supervised or unsupervised learning of the deep learning.

The neural network includes an input layer, a hidden layer, and an output layer. The input layer, the hidden layer, and the output layer each include a plurality of nodes.

The hidden layer may include a number of layers in various ways. Input data may be input directly to the input layer and also be input directly to the hidden layer. In the neural network, nodes of layers other than the output layer are connected to nodes of a subsequent layer through links for transmitting output signals. A number of the links corresponds to a number of the nodes included in the subsequent layer.

In each node included in the hidden layer, an output of an activation function associated with weighted inputs of nodes included in a previous layer is input. The weighted input is obtained by multiplying inputs of the nodes included in the previous layer by a synaptic weight. The synaptic weight is also referred to as a model parameter of the neural network. The activation function includes, for example, a sigmoid, a hyperbolic tangent (tan h), and a rectified linear unit (ReLU). The activation function is used to form a nonlinearity of the neural network. The weighted inputs of the nodes included in the previous layer are input to each of nodes included in the output layer.

When input data is given, the neural network calculates function values corresponding to a number of classes to be classified and recognized in the output layer through the hidden layer, and classifies the input data as a class having a greatest value thereof.

When a width and a depth of the neural network are sufficient, the neural network may have a capacity of implementing a predetermined function. When the neural network learns a sufficient amount of training data through an appropriate training process, an optimal recognition performance may be achieved.

FIG. 8 illustrates a basic structure of a vanishing-point detection model 810.

Referring to FIG. 8, the vanishing-point detection model 810 may be implemented in a machine learning structure trained to output rotation reference point information 809 from image data 801. For example, the vanishing-point detection model 810 may include, but is not limited to, the aforementioned neural network. The rotation reference point information 809 may be 2D coordinates, for example, an x coordinate and a y coordinate, on an image plane of a point corresponding to a second rotation reference point. In the vanishing-point detection model 810, dimensions of an input layer and an output layer are fixed, but a structure of a hidden layer may be unlimited.

A training apparatus trains the vanishing-point detection model 810 based on training data. The training data includes a pair of a training input and a training output. The training output may be ground truth data given for a predetermined training input and may be a training reference point, for example, coordinates of a rotation reference point. The training apparatus trains the vanishing-point detection model 810 to output the training reference point from a training image. For example, the training apparatus updates a model parameter such that a loss between the training reference value and a temporary output calculated based on the vanishing-point detection model 810 from the training image. The training apparatus repetitively updates a model parameter until the loss converges. The trained model is stored in a position estimation apparatus.

FIG. 9 illustrates an operation using a lane boundary detection model 920 and a vanishing-point detection model 910.

Referring to FIG. 9, the position estimation apparatus extracts a landmark object from image data 901. For example, the position estimation apparatus detects, based on the vanishing-point detection model 910, a second rotation reference point as rotation reference point information 909 from the landmark object.

The position estimation apparatus detects a lane boundary as the landmark object. The position estimation apparatus detects, based on the lane boundary detection model 920, the lane boundary from the image data 901. The lane boundary detection model 920 may be a model trained to output points corresponding to the land boundary from the image data 901.

A training apparatus loads the lane boundary detection model 920 trained in advance. The training apparatus outputs, based on the trained lane boundary detection model 920, a lane boundary image from the image data 901. The training apparatus calculates, based on the vanishing-point detection model 910, a temporary output from the land boundary image and updates a model parameter based on a loss between the temporary output and a training output. The training apparatus may update only a model parameter of the vanishing-point detection model 910 while maintaining a model parameter of the lane boundary detection model 920.

However, in another example, joint training may be performed on both of the vanishing-point detection model 910 and the lane boundary detection model 920 as described with reference to FIG. 10.

FIG. 10 illustrates an example of training a same neural network structure as that of the example of FIG. 9.

Referring to FIG. 10, a position estimation apparatus outputs, based on a lane boundary detection model 1020, lane boundary information 1008 from image data 1001. The position estimation apparatus outputs, based on a vanishing-point detection model 1010, rotation reference point information 1009 from the lane boundary information 1008.

For example, a training apparatus calculates the lane boundary information 1008 by propagating the image data 1001 to the lane boundary detection model 1020. Also, the training apparatus calculates the rotation reference point information 1009 by propagating the lane boundary information 1008 to the vanishing-point detection model 1010. The training apparatus updates model parameters of the lane boundary detection model 1020 and the vanishing-point detection model 1010 simultaneously or sequentially, based on a reference point loss of the rotation reference point information 1009 and a lane boundary loss of the lane boundary information 1008. In such training process, training of the vanishing-point detection model 1010 and training of the lane boundary detection model 1020 may improve each other.

Figure 11:
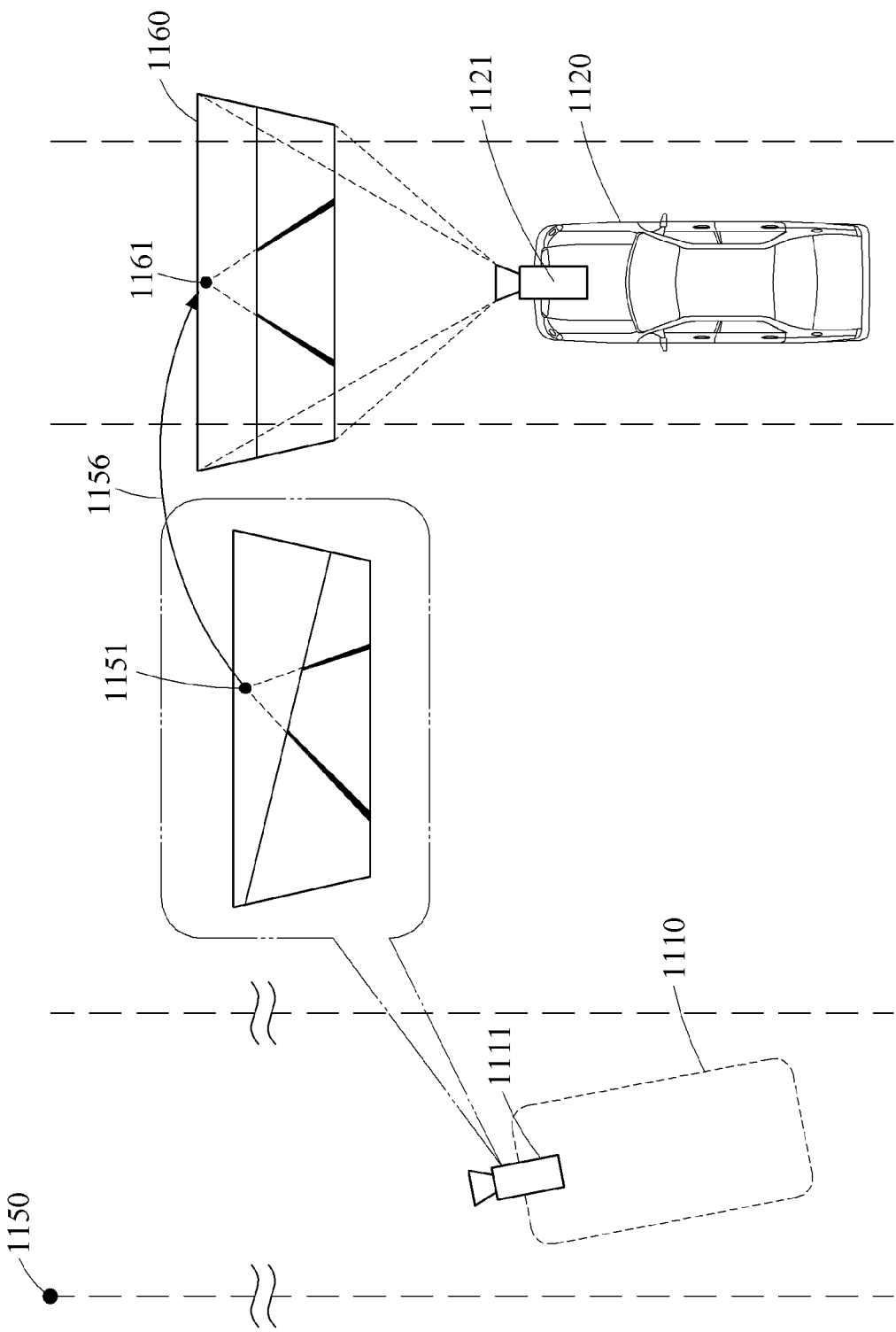
FIG. 11 illustrates an example of a rotation reference point error between initial localization information estimated for a position estimation apparatus and a real pose of the position estimation apparatus.

FIG. 11 is a diagram illustrating an example of a rotation reference point between initial localization information estimated for a position estimation apparatus and a real pose of the position estimation apparatus.

In the example of FIG. 11, it is assumed that a target 1110 of a pose based on initial localization information is positioned obliquely with respect to a lane boundary. Here, the pose of the target 1110 is virtually illustrated based on the initial localization information. As described with reference to FIG. 6, a position estimation apparatus determines a point located beyond a threshold distance from the target 1110 among points defining a boundary line of a lane in which the target 1110 is travelling, to be a first rotation reference point 1150. When the first rotation reference point 1150 is projected onto an image plane corresponding to an angle of field of a sensor 1111 attached to the target 1110 in the pose based on the initial localization information, a point 1151 to which the first rotation reference point 1150 is projected is indicated as shown in FIG. 11.

Unlike the initial localization information, a real target 1120 is oriented parallel to the lane boundary. A sensor 1121 of the real target 1120 captures a front-view image from the target 1120. The position estimation apparatus detects a second rotation reference point 1161 from image data 1160 as described with reference to FIGS. 7 through 10.

As the foregoing, due to an error in the initial localization information, a point to which the first rotation reference point 1150 is projected directly on the image plane and the second rotation reference point 1161 may appear at different points. Thus, a difference 1156 between the point to which the first rotation reference point 1150 is projected on the image plane and the second rotation reference point 1161 may correspond to the error, for example, a rotation error and a position error, in the initial localization information.

By using the rotation parameter calculated in the example of FIG. 5, the position estimation apparatus may correct the initial localization information as described with reference to FIG. 12 below.

Figure 12:
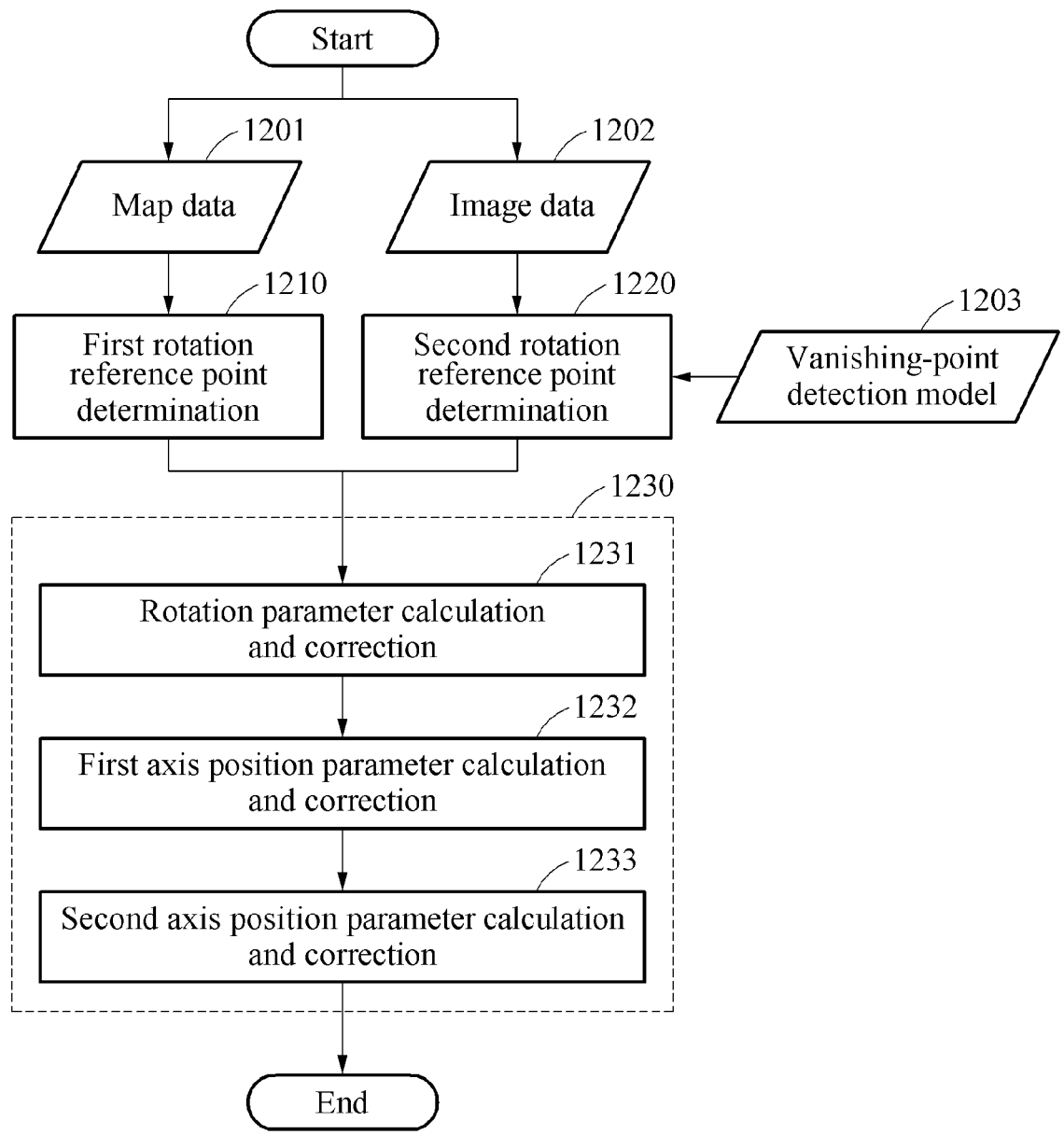
FIG. 12 illustrates an example of an operation of correcting initial localization information using a first rotation reference point and a second rotation reference point.
Figure 13:
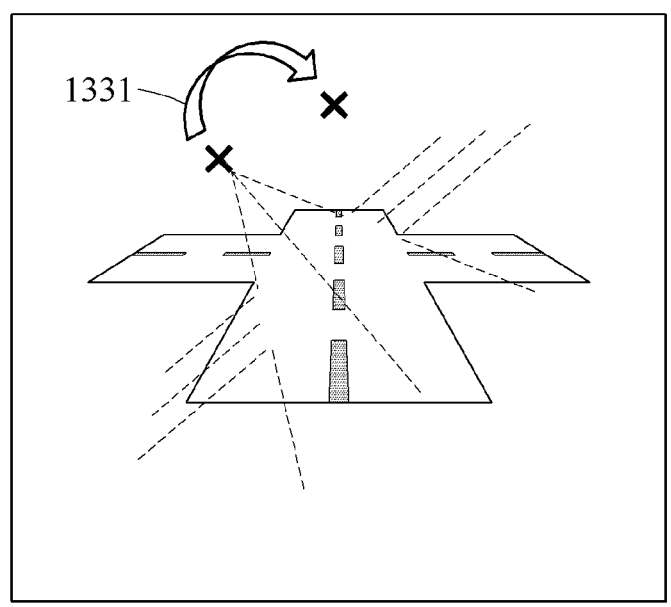
FIG. 13 illustrates an example of an operation of correcting localization information using a rotation parameter.
Figure 14:
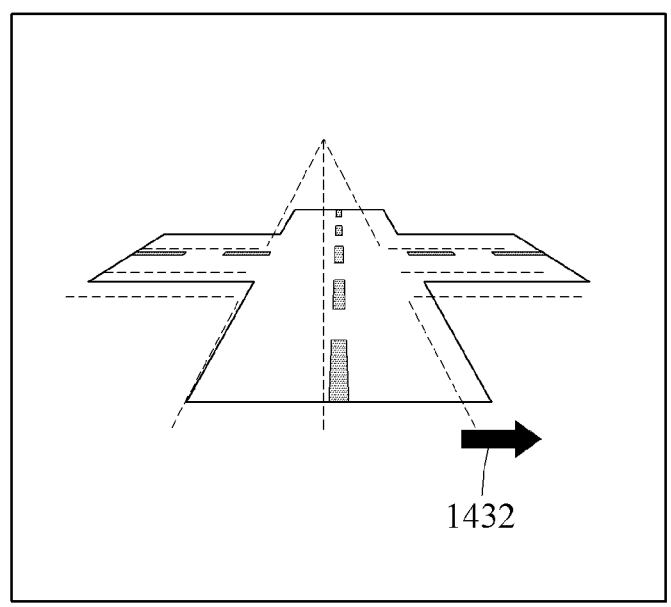
FIGS. 14 and 15 illustrate examples of an operation of correcting localization information using a position parameter.
Figure 15:
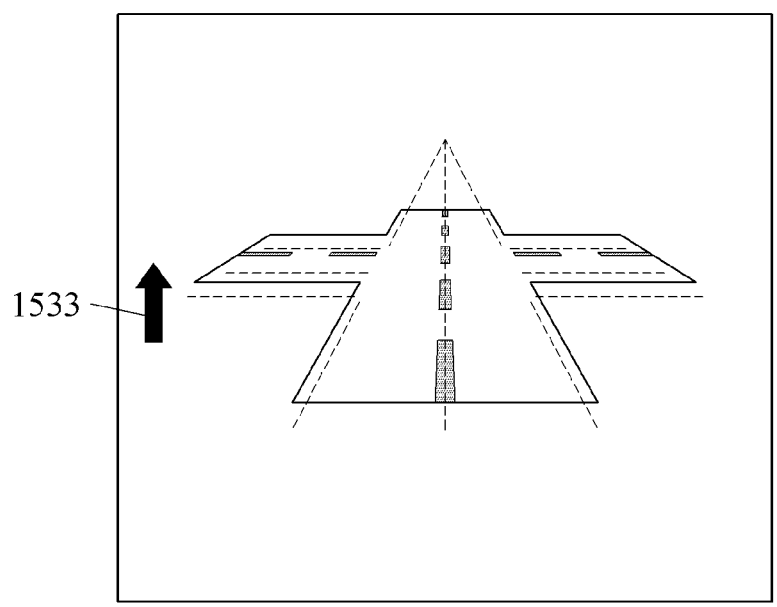

FIG. 12 is a diagram illustrating an example of an operation of correcting initial localization information using first rotation reference point and second rotation reference point. FIG. 13 is a diagram illustrating an example of an operation of correcting localization information using a rotation parameter. FIGS. 14 and 15 are diagrams illustrating examples of an operation of correcting localization information using a position parameter.

A position estimation apparatus acquires map data 1201. In operation 1210, the position estimation apparatus determines a first rotation reference point based on initial localization information from the map data 1201. The description of determining the first rotation reference point is made with reference to FIG. 6 and thus, a repeated description of determining the first rotation reference point will be omitted.

The position estimation apparatus acquires image data 1202. In operation 1220, the position estimation apparatus detects a second rotation reference point from the image data 1202 based on a vanishing-point detection model 1203. The vanishing-point detection model 1203 may be a mathematical model or a model of a machine learning structure.

In operation 1230, the position estimation apparatus corrects the initial localization information using a rotation parameter and a position parameter. A detailed description of operation 1230 is provided below.

In operation 1231, the position estimation apparatus calculates a rotation parameter and corrects the initial localization information using the rotation parameter. The position estimation apparatus calculates the rotation parameter based on the first rotation reference point and the second rotation reference point. For example, the position estimation apparatus calculates a rotation parameter associated with an initial pose from the first rotation reference point and the second rotation reference point. Also, the position estimation apparatus determines final localization information by correcting localization information based on the calculated rotation parameter. For example, the position estimation apparatus determines a final pose of a target by correcting the initial pose using the rotation parameter. By compensating for the rotation parameter as indicated by an arrow 1331 of FIG. 13, a point to which the first rotation reference point is projected on an image plane rotates about a sensor.

The position estimation apparatus calculates a position parameter associated with the initial position of the target after determining the final pose as described above. The position estimation apparatus determines a final position of the target by correcting the initial position using the position parameter.

For example, in operation 1232, the position estimation apparatus calculates a first axis position parameter and corrects the localization information using the first axis position parameter. The position estimation apparatus applies an offset on a first axis to the initial position. The position estimation apparatus applies a component corresponding to a lateral axis from the position parameter to the localization information. By compensating for the first axis position parameter to the localization information as indicated by an arrow 1432 of FIG. 14, a position on the first axis to which the first rotation reference point is projected on the image plane may be moved.

In operation 1233, the position estimation apparatus calculates a second axis position parameter and corrects the localization information using the second axis position parameter. The position estimation apparatus applies an offset on a second axis, which is different from the first axis, to the initial position. The position estimation apparatus applies a component corresponding to a longitudinal axis from the position parameter to the localization information. By compensating for the second axis position parameter to the localization information as indicated by an arrow 1532 of FIG. 15, a position on the second axis to which the first rotation reference point is projected on the image plane may be moved.

The position estimation apparatus determines a position parameter, for example, the first axis position parameter and the second axis position parameter, based on an image landmark detected from the image data 1202 and a map landmark detected from the map data 1201. For example, the position estimation apparatus calculates the position parameter based on a difference between 2D coordinates of the map landmark detected from the map data 1201 and 2D coordinates of the image landmark corresponding to the map landmark. The position estimation apparatus sets a landmark score for each landmark detected from the image data 1202. The position estimation apparatus projects the map landmark included in the map data 1201 to an image plane (for example, a plane based on an angle of field of a sensor at an initial position and an initial pose) and calculates a matching score based on a degree of overlap between image landmarks in the image data 1202. In response to a position parameter corresponding to 2D coordinates of the map landmark or 2D coordinates of the image landmark being moved, the position estimation apparatus determines a position parameter corresponding to a coordinate movement value indicating a highest matching score.

As the foregoing, the position estimation apparatus calculates the position parameter and the rotation parameter and applies the position parameter and the rotation parameter to the initial localization information, thereby determining accurate final localization information.

Based on the final localization information, the position estimation apparatus provides information used for determining whether the target reaches a predetermined place on the map data 1201 or whether the target is deviated from a path. The position estimation apparatus may be combined with a vehicle information system. Also, a position estimation method may be implemented in a form of software, web service, and a chip in a vehicular device so as to be provided.

The position estimation apparatus may be applied to localization based on the image and the map data 1201 in an AR environment. For example, the position estimation apparatus may be provided at low cost and in a small size. Also, even when an error occurs between the map landmark of the map data 1201 and the image landmark of the image data 1202, the position estimation apparatus compensates for the error using the position parameter and the rotation parameter as described above. Furthermore, the position estimation apparatus may determine the position parameter and the rotation parameter without restrictions on the number of landmarks, for example, even when the number of landmarks is less than 4.

The position estimation apparatus may robustly determine a rotation parameter for compensating for a rotation error, which is a critical factor of localization, using rotation reference points.

The processor 120 and the memory 130 in FIG. 1 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 5, 8-10, and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a position, the method comprising:
   determining a first rotation reference point based on localization information estimated for a target and map data;
   estimating a second rotation reference point from image data associated with a front view of the target; and
   correcting the localization information using a rotation parameter calculated based on the first rotation reference point and the second rotation reference point,
   wherein the determining of the first rotation reference point comprises:
   spanning a lane boundary line included in a candidate area being extracted from the map data; and
   determining a point located beyond a threshold distance from the target, among points on the spanned lane boundary line, to be the first rotation reference point.

2. The method of claim 1, further comprising:
   estimating the localization information by estimating initial localization information including an initial position and an initial pose of the target based on sensing data sensed by a sensor.

3. The method of claim 1, wherein the extracting of the candidate area comprises extracting an area adjacent to the target in the front view as the candidate area.

4. The method of claim 1, wherein the extracting of the candidate area comprises extracting an area including a lane boundary line associated with a lane in which the target is travelling as the candidate area.

5. A method of estimating a position, the method comprising:
   determining a first rotation reference point based on localization information estimated for a target and map data;
   estimating a second rotation reference point from image data associated with a front view of the target; and
   correcting the localization information using a rotation parameter calculated based on the first rotation reference point and the second rotation reference point,
   wherein the estimating of the second rotation reference point comprises detecting the second rotation reference point from the image data based on a vanishing-point detection model.

6. The method of claim 5, wherein the vanishing-point detection model comprises a model trained to output a training reference point from a training image.

7. The method of claim 5, wherein the detecting of the second rotation reference point comprises:
   extracting a landmark object from the image data; and
   detecting the second rotation reference point from the landmark object based on the vanishing-point detection model.

8. The method of claim 1, wherein the correcting of the localization information comprises:
   calculating a rotation parameter based on the first rotation reference point and the second rotation reference point; and
   determining final localization information by correcting the localization information based on the calculated rotation parameter.

9. The method of claim 8, wherein the calculating of the rotation parameter comprises determining a rotation parameter for correcting the first rotation reference point such that a point obtained by projecting the first rotation reference point onto an image plane matches the second rotation reference point.

10. A method of estimating a position, the method comprising:
determining a first rotation reference point based on localization information estimated for a target and map data;
estimating a second rotation reference point from image data associated with a front view of the target; and
correcting the localization information using a rotation parameter calculated based on the first rotation reference point and the second rotation reference point,
wherein the correcting of the localization information comprises:
calculating a rotation parameter based on the first rotation reference point and the second rotation reference point; and
determining final localization information by correcting the localization information based on the calculated rotation parameter, and
wherein the calculating of the rotation parameter comprises calculating the rotation parameter based on three-dimensional (3D) coordinates of the first rotation reference point, two-dimensional (2D) coordinates of the second rotation reference point, a camera intrinsic parameter, and a roll angle of the target.

11. The method of claim 8, wherein the determining of the final localization information comprises determining a final pose of the target by correcting an initial pose using the rotation parameter.

12. The method of claim 11, wherein the correcting of the localization information further comprises:
calculating a position parameter of an initial position of the target after the final pose is determined; and
determining a final position of the target by correcting the initial position using the position parameter.

13. The method of claim 12, wherein the determining of the final position comprises:
applying an offset on a first axis to the initial position; and
applying an offset on a second axis differing from the first axis to the initial position.

14. The method of claim 13, wherein the applying of the offset on the first axis comprises applying a component corresponding to a horizontal axis of the target from the position parameter to the localization information, and
wherein the applying of the offset on the second axis comprises applying a component corresponding to a longitudinal axis of the target from the position parameter to the localization information.

15. The method of claim 12, wherein the calculating of the position parameter comprises determining the position parameter based on a map landmark detected from the map data and an image landmark detected from the image data.

16. The method of claim 12, wherein the calculating of the position parameter comprises determining the position parameter based on a difference between 2D coordinates of a map landmark detected from the map data and 2D coordinates of an image landmark detected from the image data and corresponding to the map landmark.

17. A non-transitory computer-readable storage medium storing instructions that, when executed by a processor, cause the processor to perform the method of claim 1.

18. An apparatus for estimating a position, the apparatus comprising:
a sensor configured to sense image data; and
a processor configured to
determine a first rotation reference point based on localization information estimated for a target and map data,
estimate a second rotation reference point from image data associated with a front view of the target, and
correct the localization information using a rotation parameter calculated based on the first rotation reference point and the second rotation reference point,
wherein, for the determining of the first rotation reference point, the processor is configured to:
span a lane boundary line included in a candidate area being extracted from the map data; and
determine a point located beyond a threshold distance from the target, among points on the spanned lane boundary line, to be the first rotation reference point.

19. The apparatus of claim 18, wherein the target is a vehicle and the sensor is attached to the vehicle.

20. The apparatus of claim 18, wherein the localization information comprises information obtained from a GPS signal and an acceleration signal.

21. The method of claim 1, wherein the estimating of the second rotation reference point comprises detecting the second rotation reference point from the image data based on a vanishing-point detection model.

22. The method of claim 21, wherein the vanishing-point detection model comprises a model trained to output a training reference point from a training image.

23. The method of claim 21, wherein the detecting of the second rotation reference point comprises:
extracting a landmark object from the image data; and
detecting the second rotation reference point from the landmark object based on the vanishing-point detection model.

24. The method of claim 8, wherein the calculating of the rotation parameter comprises calculating the rotation parameter based on three-dimensional (3D) coordinates of the first rotation reference point, two-dimensional (2D) coordinates of the second rotation reference point, a camera intrinsic parameter, and a roll angle of the target.

* * * * *